United States Patent Office
3,469,161
Patented Sept. 23, 1969

3,469,161
CAPACITORS EMPLOYING LEAD SILICO-BORATE GLASS COMPOSITIONS
Earl K. Davis, Monroeville, Pitcairn, Pa., assignor to Westinghouse Electric Corporation, East Pittsburgh, Pa., a corporation of Pennsylvania
Filed Nov. 13, 1964, Ser. No. 410,928
Int. Cl. H01g 1/00
U.S. Cl. 317—258                              3 Claims

ABSTRACT OF THE DISCLOSURE

A capacitor having spaced confronting metal plates or electrodes is constructed with a lead silico-borate glass dielectric layer and encapsulant. The weight composition of the lead silico-borate glass is in the range of from about 35–40% PbO, 26 to 33% $SiO_2$, 6–9% $B_2O_3$, 3.5 to 6.5% $K_2O$, 2 to 4% $Na_2O$, 3 to 4% $TiO_2$, 3 to 4% ZnO and about 5 to 8% BaO, 1 to 3% $Al_2O_3$, 1–2 $Li_2O$, 1–2% $V_2O_5$, 0.25–0.5 $As_2O_3$ and 0.1% $Co_2O_3$ are included in the composition.

---

This invention relates to lead silico-borate glass compositions and to electrical or electronic capacitors employing the glass compositions as dielectric and encapsulating coatings.

The electrical characteristics of a capacitor are functions of such variables as the confronting surface area of the metal plates, the thickness of the dielectric layer or the distance between the plates, the dielectric constant of the dielectric layer, the temperature coefficient of capacitance for the dielectric layer, the power loss or Tangent $\delta$ of the dielectric layer, the "Q" factor and the insulation resistance of the layer. Other factors also influence the characteristics of the capacitor to a smaller degree or in other ways. The electrical properties of the material employed to encapsulate the basic capacitor unit for example, will affect the electrical characteristics of the capacitor at high frequencies and the chemical durability or moisture resistance, for example, will influence the permissible environmental exposure conditions for the capacitor.

It is apparent that the characteristics of glass-metal capacitors are largely dependent on the electrical properties of the glass, properties which in turn are determined by the composition of the glass. The glass composition also controls the chemical and physical properties of the glass, properties such as durability resistance to moisture, viscosity, surface tension and adhesion, some of which determine the possibility and ease of applying the glass coating to the metal capacitor plates. Where the coatings are to be applied to aluminum or aluminum alloys by dipping the aluminum tabs or plates into a glass slip and firing, and the capacitors are to be made by stacking the coated plates and firing to fuse the plates together into a basic capacitor unit separated by the dielectric coating, because of the relatively low melting point of aluminum, the glass must have a low viscosity and other attributes which will permit coatings to be applied at low temperatures. The dielectric layer must also be capable of being deposited as a relatively thin film or coating, must form a good bond with the capacitor plates or electrodes and must possess other properties which will be apparent from this specification and/or which will be well known to those skilled in the art.

It will be apparent to those skilled in the art that few ordinary glass compositions possess the necessary electrical and other properties to be employed as dielectric layers in highly stable, quality capacitors and that glass compositions which are known to be suitable dielectrics ordinarily have high viscosities. High viscosity is not a prohibitive or limiting factor in methods where preformed glass plates are employed to form the dielectric layer. It is apparent, however, that the viscosity and other application characteristics of the glass are important limitations in methods where the capacitor or tabs are actually coated with glass and the coated plates are then fused together into basic capacitor units.

The glass dielectric must have a low viscosity so that it can be fired onto the aluminum tabs at temperatures below 625° C. In this lead silico-borate type glass, it was found that the sag point, an index of glass viscosity, should not exceed about 425° C. for successful application. Compositions having sag points lower than 400° C. are very desirable since a greater range and ease of application would be possible. The glass must have good flow characteristics when fired onto the tabs to achieve a smooth uniform and bubble-free coating, must have good adherence to the tabs after firing and must be resistant to devitrification so that the glass can withstand subsequent heating schedules employed in fusing coating tabs into basic capacitor units and encapsulating the capacitor units. The chemical durability of at least the encapsulating glass must be sufficiently high to permit the glass-metal capacitors to withstand various environmental tests including boiling for 96 hours in saturated salt water. The problem of obtaining satisfactory electrical properties is thus further complicated by the physical and chemical properties required to produce satisfactory capacitors.

For a capacitor to be employed in applications which require stable electrical characteristics under widely varying environmental conditions, the glass dielectric should have the following electrical characteristics: (1) Tangent $\delta$ at 25° C. should be below about 0.001, (2) Tangent $\delta$ at 125° C. should be below about 0.002, (3) the Dielectric Constant should be at least 10, (4) $T_c$ (temperature coefficient of capacitance) should be equal to 140±25 p.p.m./° C. average both from 25 to −55° C. and from 25 to 125° C., (5) a Q value of at least 1500 and (6) an IR value (insulation resistance) of at least about 300 at 125° C.

Accordingly, it is an object of this invention to provide lead silico-borate glass compositions which have high electrical properties together with an excellent range of application properties, which make the compositions suitable for application to aluminum and its alloys.

An object of this invention is to provide novel lead silico-borate glass compositions having low viscosities, excellent electrical properties and a high degree of chemical durability.

Another object of this invention is to provide capacitors with dielectric layers of lead silico-borate glass compositions so that high electrical characteristics may be consistently attained and maintained under widely varying environmental conditions.

Yet another object of the invention is to provide capacitors of aluminum plate electrodes and glass dielectric layers that maintain high electrical characteristics over wide temperature ranges and varying environmental conditions.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawing, in which.

Figure 1:
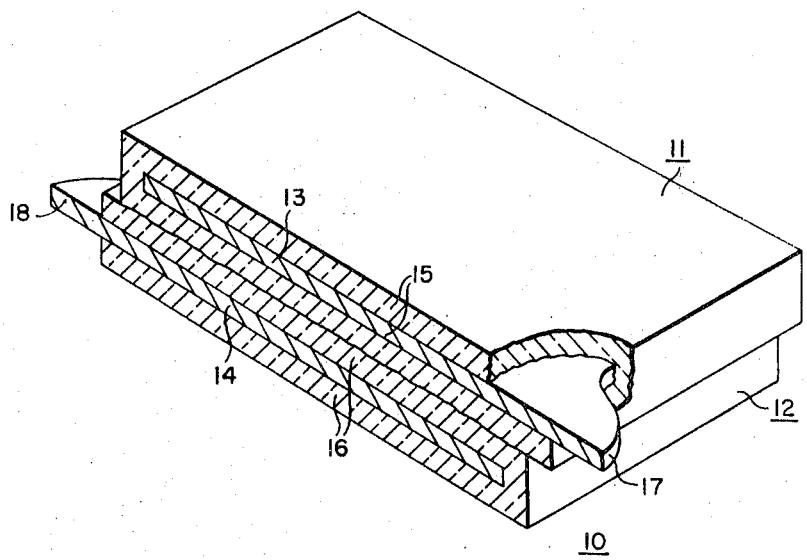
FIGURE 1 is a perspective section of a basic capacitor unit.

The lead silico-borate glass compositions of this invention are prepared by melting batches of specific ingredients, outlined in detail hereinbelow, in certain critical proportions in a fire clay crucible in an electric furnace held at a temperature of about 2000° C. The batches are melted and fired within about 5 hours, the molten composition being stirred as an aid to homogenizing the composition. The homogenized molten composition is poured into water or air so that it is rapidly cooled and shattered to form a frit to make the subsequent reduction of particle size easier. The glass frit is crushed by ball milling in a suitable vehicle such as alcohol to form a slip of finely divided particles in the vehicle. The finely divided particles may, for example, have a particle size of 325 mesh or finer. This glass slip may then be employed to coat various substrates, including metal capacitor plates of aluminum or alloys thereof.

Lead silico-borate glasses in accordance with this invention are prepared from batch compositions having the following constituents in about the indicated proportions:

| Constituents | Total composition range in weight percent | Preferred composition range in weight percent |
| --- | --- | --- |
| PbO | 30–50 | 35–40 |
| $SiO_2$ | 22–35 | 25–32 |
| $B_2O_3$ | 5–15 | 7–10 |
| $K_2O$ | 5–8 | 4–7 |
| $Na_2O$ | 2–5 | 2–4 |
| $TiO_2$ | 2–6 | 3–4 |
| ZnO | 1–6 | 3–4 |
| BaO | 2–10 | 5–8 |
| $Al_2O_3$ | 0–5 | 1–3 |
| $Li_2O$ | 0–5 | 1–2 |
| $V_2O_5$ | 0–3 | 1–2 |
| $As_2O_3$ | 0–1 | 0.25–0.5 |
| $Co_2O_3$ | 0–0.1 | 0–0.1 |

In order to more fully describe the present invention, specific examples of the batch compositions are presented in Table I, hereinbelow. Preferably, these ingredients are mixed for at least 1 hour before melting. The melting, firing, mixing, quenching and ball-milling steps outlined hereinabove are employed in the preparation of each sample.

TABLE I.—Batch Compositions, Weight Percentages

| Constituents | Sample I | Sample II | Sample III |
| --- | --- | --- | --- |
| PbO | 38.25 | 38.23 | 38.30 |
| $SiO_2$ | 28.22 | 30.25 | 30.31 |
| $B_2O_3$ | 10.66 | 8.64 | 7.78 |
| $K_2O$ | 6.27 | 6.27 | 4.26 |
| $Na_2O$ | 3.35 | 3.35 | 2.30 |
| $TiO_2$ | 3.58 | 3.58 | 3.58 |
| ZnO | 3.07 | 3.07 | 3.58 |
| BaO | 2.38 | 2.38 | 7.16 |
| $Al_2O_3$ | 2.05 | 2.04 | |
| $Li_2O$ | 1.66 | 1.66 | 1.20 |
| $V_2O_5$ | | | 1.02 |
| $As_2O_3$ | .51 | .51 | .51 |
| $Co_2O_3$ | | .02 | |

It should be noted that the ingredients $Al_2O_3$, $Li_2O$, $V_2O_5$, $As_2O_3$ and $Co_2O_3$ are optionally included in the total range. All of the ingredients, except $Co_2O_3$, should be included in the preferred composition range. Comparatively speaking, the optional ingredients do not greatly improve the properties but the additional benefits derived therefrom are desirable. When the optional ingredients are employed, about 0.25 percent, by weight, is considered to be an effective amount, again except for $Co_2O_3$. The $Co_2O_3$ is employed to provide an identifying blue color, and the color may be produced with as little as 0.02 percent and no more than 0.1 percent, by weight, of $Co_2O_3$, without detracting from the high electrical, chemical and physical properties of the glass compositions. The other optional ingredients offer refined improvements, primarily in application properties and resistance to devitrification, without detracting from the other desirable properties.

Because of the volatility of some ingredients, the final composition of the glass will vary to a small degree from the batch composition but in a generally known predictable manner. In the foregoing Samples, Sample Nos. I and II were prepared in two pound melts while Sample No. III was prepared from a ten pound melt. Up to about one-fifth of the alkali metal oxides and up to about one-fourth of the $B_2O_3$ may be volatilized and lost. Since there is some pick-up from the clay crucible, there may also be an increase of about 2%, by weight, of $SiO_2$ and about 2% by weight of $Al_2O_3$. An increase of 2% of $SiO_2$ in Sample No. 1, for example, could produce a final composition with 30.22% of $SiO_2$.

The final glass composition of this invention must contain (1) from about 30 to 50% of PbO, (2) about 23 to 36% of $SiO_2$, (3) about 4 to 13% of $B_2O_3$, (4) about 3.5 to 6.5% of $K_2O$, (5) about 2 to 5% of $Na_2O$, (6) about 2 to 6% of $TiO_2$, (7) about 1 to 6% of ZnO and (8) about 2 to 10% of BaO; and may contain (9) up to about 5% of $Al_2O_3$, (10) up to about 5% of $Li_2O$, (11) up to about 3% of $V_2O_5$, (12) up to about 1% of $As_2O_3$, and (13) up to about 0.1% of $Co_2O_3$, the proportions being expressed in weight percentages.

For the optimum balance of electrical, chemical and physical properties, the preferred final glass composition, expressed in weight percentages, must contain (1) from about 35 to 40% of PbO, (2) from about 26 to 33% of $SiO_2$, (3) from about 6 to 9% of $B_2O_3$, (4) about 3.5 to 6.5% of $K_2O$, (5) about 2 to 4% of $Na_2O$, (6) about 3 to 4% of $TiO_2$, (7) about 3 to 4% of ZnO, (8) about 5 to 8% of BaO, (9) about 1 to 3% of $Al_2O_3$, (10) about 1 to 2% of $Li_2O$, (11) about 1 to 2% of $V_2O_5$ and (12) about 0.25 to 0.5% of $As_2O_3$; and may contain (13) about 0 to 0.1% of $Co_2O_3$. It is to be understood that the composition ranges are critical in attaining both the desired functional and application properties.

In Table II, a summary of test results is presented on samples prepared from the three compositions outlined in Table I. For measuring sag point, each sample of glass was formed into a rod approximately 5 centimeters long with a diameter of $0.2\pm0.05$ millimeters. The sag point was determined in accordance with the method and with apparatus described by Hirayama in an article entitled "The Sag Point of Glasses," published in the Journal of the American Ceramics Society, volume 45, No. 3, March 1962, pages 113–115. The sag point may be correlated with the softening point, both indices being measured by observing the bending or elongation, respectively, of heated fibers under given conditions, and both being functions of the glass viscosity.

The electrical properties were measured on samples two inches in diameter, cast from each of the exemplary batch compositions of Table I. Each sample was ground to a thickness of about 0.1 inch. Silver electrodes were painted on the discs. Dielectric constants, dissipation factors and temperature coefficients were measured at 1 kilocycle with a General Radio Digital Bridge #1615A. The temperature coefficient of capacitance from 25° C. to —55° C. was determined by measuring capacitance at 25° C. and —55° C. and calculating the average variation of capacitance per degree centigrade by dividing the total variation in capacitance by the total temperature range. The temperature coefficient of capacitance from 25° C. to 125° C. was similarly determined by measuring capacitance at 25° C. and at 125° C. and calculating as above. The Q factor, a measure of capacitor value, is the ratio of the reactive resistance to the ohmic resistance, that is $Q = Xc/R$. The measurements required for determining the Q factor were conducted at a frequency of 1 megacycle on a T-60A Q meter manufactured by the Boonton Radio Co. The insulation resistance is the product of the resistance in megohms and the capacitance in microfarads. The insulation resistance is measured at 125° C. employing direct current. Reference may be had to MIL-STD-202 for details on the test procedures.

TABLE II.—Summary of Properties

| Property | Sample I | Sample II | Sample III |
|---|---|---|---|
| Dielectric constant | 10.81 | 10.4 | 10.6 |
| Tan δ at 25° C | 0.00049 | 0.00051 | 0.0004 |
| Tan δ at 125° C | 0.0015 | 0.0017 | 0.0011 |
| $T_c$ (25° C. to −55° C.) | 135 | 132 | 131 |
| $T_c$ (25° C. to 125° C.) | + 147 | 159 | 150 |
| Q | 1,450 | 1,700 | 1,690 |
| IR | | 300 | 488 |
| Sag point, ° C | | 368 | |

The glass compositions of this invention may be readily formed into plates and rods or coated onto metal sheets or other substrate materials as thin films. The thin films may be deposited onto metal sheets, for example, from a slip containing the finely divided glass particles suspended in a volatile liquid vehicle such as alcohol. The metal sheets may be conveniently dipped into the slip and withdrawn with a coating of the slip deposited thereon. The rheological properties of the slip will be such that a thin but uniform coating may be deposited, in the order of ¼ to 2 mils in thickness. Coating was successfully made when fired in a furnace held at about 600° C. for about 1 minute. In the furnace, the finely divided glass particles will be fused and will flow into a thin uniform coherent coating on the metal sheet. A second coating may be applied and fired without adversely affecting the quality of the original coat. Since the glass compositions of this invention have a sufficiently low viscosity at temperatures of about 600° C. to be fused, flowed and bonded to the metal sheet or to other low viscosity glass coatings in contact therewith, they are especially suitable for use with low melting metals such as aluminum and aluminum alloys which have melting points in the order of about 660° C.

Referring now to FIG. 1 of the drawing, there is illustrated a basic capacitor unit 10 constructed in accordance with the invention from two capacitor core assemblies 11, 12. To form the core assemblies 11, 12, the metal plates 13, 14, which are fabricated from aluminum foil having a thickness of about ½ mil, are dipped into a slip containing finely divided suspended particles of the glass described as Sample No. III in Table I, hereinabove. The plates are preferably cleaned and degreased before this operation so that a thin but uniform coating of the slip is deposited on the plates. The plates are heated in an oven or furnace at a temperature of about 600° C. for about 1 minute so that the glass particles are fused. The fused glass will flow uniformly over the plates. In this manner, the plates 13, 14 may be provided with the dielectric glass coatings 15, 16 having a thickness of about 1–4 mils.

The entire plate is not dipped into the glass slip so that a portion of each plate 13, 14 is uncoated. The terminal tabs 17, 18 may then be conveniently connected to the uncoated portions. The tabs 17, 18 may also be extending portions of the plates 13, 14 (as illustrated) to which auxiliary terminals may be attached outside of the dielectric glass envelope. The coated core assemblies are placed in a suitable heated press and refired to weld the assemblies into a monolithic mass with confronting plate surfaces separated by the dielectric glass coatings. The confronting area and the distance between the plates are controlled to provide the desired capacitance. It should be understood that larger numbers of core assemblies may be stacked, welded together and electrically connected either in parallel or in series to provide capacitors of varied design. It should also be understood that the glass compositions of this invention are suitable for use in the convenient rapid automated methods described in detail in application Ser. No. 392,732, now U.S. 3,305,914, issued Feb. 28, 1967, and assigned to the assignee of this application.

The basic capacitor units 10 may be encapsulated in a suitable material in order to provide a further protective envelope for exposure to varied and rigorous environments. In applications where the capacitor must operate effectively at frequencies up to 1000 megacycles, the protective envelope or casing will influence the properties of the capacitor and the casing is then preferably formed from the glass compositions of this invention. The casing will then be formed from a glass having high electrical and physical properties and the high level of properties will be maintained. In such applications, it is preferred to form the dielectric layer from a glass having about the composition of Sample III in Table I and to form the casing from a glass having about the composition of Sample II of Table I. Sample II is employed as the outer encapsulating envelope because of its color and Sample III is employed as the dielectric layer because its insulation resistance is better than that of Sample II. A small amount of $Co_2O_3$ may be added to the casing glass composition to give it an attractive identifying blue color without degrading critical properties.

Figure 2:
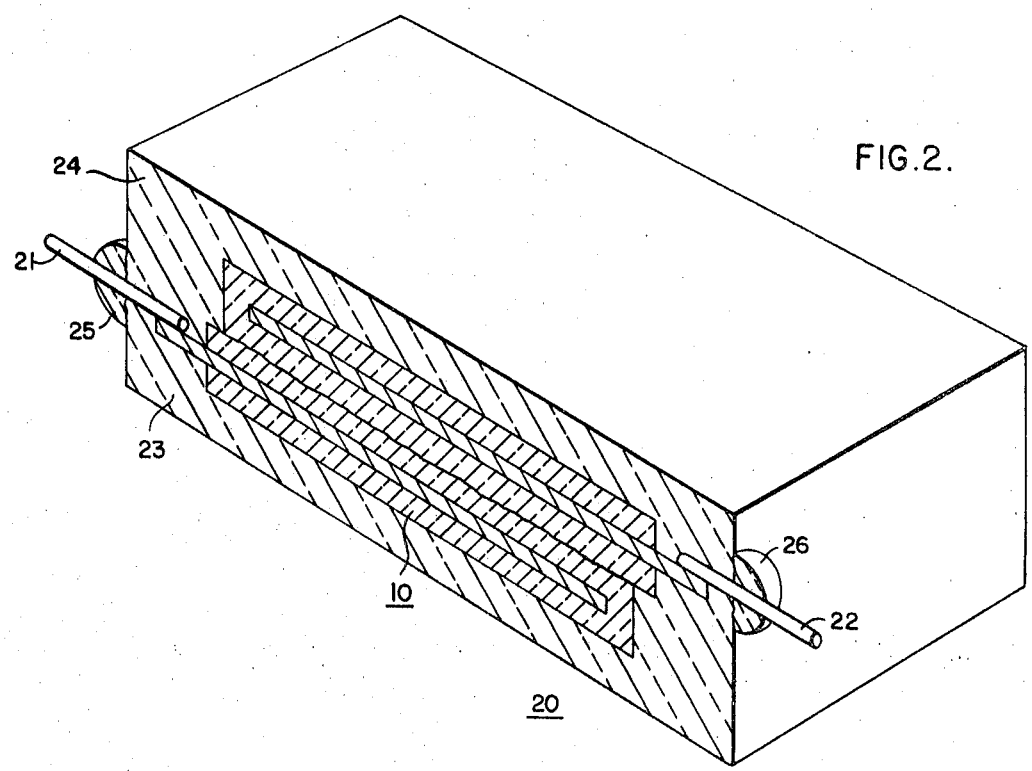
FIG. 2 is a perspective section of a completed encapsulated electronic capacitor.

Referring now to FIG. 2, there is illustrated an encapsulated or sealed capacitor 20 constructed in accordance with the invention from the basic capacitor unit 10 of FIG. 1. Suitable metal leads 21, 22, which may, for example, be fabricated from Dumet metal, are welded to the projecting tabs of the basic capacitor unit. This assembly is then placed between suitably preformed split casing or envelope halves 23, 24. Glass beads 25, 26, of the glass described in Sample No. I, Table I, may be placed about the leads and in contact with the casing halves. A predetermined pressure is applied to the casing halves, the entire assembly is heated in a furnace at about 575° C. for about 5 minutes so that the glass casings and the glass beads are fused together and so that the glass casings are fused together and to the glass coating on the metal electrodes. The pressure sealing operation may, for example, be conducted in a suitable inert gas atmosphere or vacuum to avoid contamination or to aid in avoiding the formation of voids and air pockets. As noted heretofore, the glass compositions of this invention are especially suitable for use in the convenient rapid automated methods described in detail in application Ser. No. 392,732, now U.S. 3,305,914, issued Feb. 28, 1967, and assigned to the assignee of this invention. Reference may be had thereto for details which are incorporated herein by reference.

It should also be understood that while the glass compositions of this invention appear to have a primary utility in capacitor applications, particularly with capacitors which employ aluminum or aluminum alloy plates or electrodes, other uses will occur to those skilled in the art. For example, the high dielectric constants indicate that the compositions may have utility in electroluminescent devices.

I claim:

1. An electronic capacitor comprising a plurality of metal plates having confronting surfaces separated by a dielectric layer of glass, the dielectric glass consisting essentially of the following constituents in about the indicated proportions:

| Constituents: | Weight percent |
|---|---|
| PbO | 35–40 |
| $SiO_2$ | 26–33 |
| $B_2O_3$ | 6–9 |
| $K_2O$ | 3.5–6.5 |
| $Na_2O$ | 2–4 |
| $TiO_2$ | 3–4 |
| ZnO | 3–4 |
| BaO | 5–8 |
| $Al_2O_3$ | 1–3 |

| Constituents: | Weight percent |
|---|---|
| $Li_2O$ | 1–2 |
| $V_2O_5$ | 1–2 |
| $As_2O_3$ | 0.25–0.5 |
| $Co_2O_3$ | 0–0.1 |

2. The electronic capacitor of claim 1 in which the metal plates are plates of a metal selected from the group consisting of aluminum and aluminum alloys.

3. An electronic capacitor comprising a plurality of metal plates having confronting surfaces separated by a dielectric layer of glass and an encapsulating glass envelope surrounding and sealing said metal plates and dielectric layer, the dielectric glass consisting essentially of the following constituents in about the indicated proportions:

| Constituents: | Weight percent |
|---|---|
| PbO | 38.3 |
| $SiO_2$ | 30.31 |
| $B_2O_3$ | 7.8 |
| $K_2O$ | 4.2 |
| $Na_2O$ | 2.3 |
| $TiO_2$ | 3.6 |
| ZnO | 3.6 |
| BaO | 7.2 |
| $Li_2O$ | 1.2 |
| $V_2O_5$ | 1.0 |
| $As_2O_3$ | 0.5 | the encapsulating glass consisting essentially of the following constituents in about the indicated proportions:

| Constituents: | Weight percent |
|---|---|
| PbO | 38.2 |
| $SiO_2$ | 30.3 |
| $B_2O_3$ | 8.6 |
| $K_2O$ | 6.3 |
| $Na_2O$ | 3.4 |
| $TiO_2$ | 3.6 |
| ZnO | 3.1 |
| BaO | 2.4 |
| $Al_2O_3$ | 2.0 |
| $Li_2O$ | 1.6 |
| $As_2O_3$ | 0.5 |
| $Co_2O_3$ | 0.02 |

References Cited

UNITED STATES PATENTS 2,762,713  9/1956  Davis et al. _____ 106—53

HELEN M. McCARTHY, Primary Examiner

W. R. SATTERFIELD, Assistant Examiner

U.S. Cl. X.R.

106—53, 54; 317—261